(12) United States Patent
Chen

(10) Patent No.: US 9,176,229 B2
(45) Date of Patent: Nov. 3, 2015

(54) THREE-DIMENSIONAL DISTANCE MEASURING METHOD AND ASSOCIATED SYSTEM

(71) Applicant: FLEX INSTRUMENT CO., LTD., New Taipei (TW)

(72) Inventor: Win-Throng Chen, New Taipei (TW)

(73) Assignee: FLEX INSTRUMENT CO., LTD., New Taipei (TW)

( * ) Notice: Subject to any disclaimer, the term of this patent is extended or adjusted under 35 U.S.C. 154(b) by 265 days.

(21) Appl. No.: 13/860,139

(22) Filed: Apr. 10, 2013

(65) Prior Publication Data

US 2014/0307266 A1    Oct. 16, 2014

(51) Int. Cl.
*G01S 17/46* (2006.01)
(52) U.S. Cl.
CPC .................................... *G01S 17/46* (2013.01)
(58) Field of Classification Search
CPC .... G01B 11/24; G01B 11/2509; H04N 5/335; H04N 13/0203
See application file for complete search history.

(56) References Cited

U.S. PATENT DOCUMENTS

2006/0227316 A1* 10/2006 Gatt .............................. 356/5.09
2008/0239316 A1* 10/2008 Gharib et al. .................. 356/364

* cited by examiner

*Primary Examiner* — Luke Ratcliffe
(74) *Attorney, Agent, or Firm* — Muncy, Geissler, Olds & Lowe, P.C.

(57) ABSTRACT

A three-dimensional distance measuring method includes: projecting at least one beam set forming a projection plane onto a surface of an object, the beam set including multiple beams transmitted according to a predetermined first path function and linearly arranged to form detection points on the surface of the object; rendering the beams reflected by the surface of the object to pass through a focus of a focusing element to form a sense image on a photosensitive memory element; obtaining a corresponding second path function according to an image formation position of each beam on the photosensitive memory element and a position of the focus of the focusing element; and calculating an intersection position of each first path function and the corresponding second path function to obtain a spatial position of each detection point on the object.

16 Claims, 6 Drawing Sheets

THREE-DIMENSIONAL DISTANCE MEASURING METHOD AND ASSOCIATED SYSTEM

FIELD OF THE INVENTION

The present invention relates to a distance measuring method and associated system, and particularly to a three-dimensional distance measuring method utilizing optical image computations and associated system.

BACKGROUND OF THE INVENTION

Common distance measuring methods include direct measuring and indirect measuring. In a direct measuring method, a measurer directly measures a distance between objects by utilizing a ruler. Such measuring method frequently incurs a measuring error due to different operations of measurers. In an indirect measuring method, the measuring process may be performed by an apparatus cooperating with a benchmark to calculate a distance between objects according to angles corresponding to the objects. Although the indirect measuring method renders a higher accuracy than the direct measuring method, the indirect measuring method nevertheless encounters operation inconveniences in actual applications due to environmental restrictions and a requirement of two measurers.

Other distance detection methods are developed in the recent years, e.g., distance detection through sound waves, radio waves or lasers. Among the above distance detection methods, the laser distance measuring method, featuring high accuracy, capability of clearly demarcating a detection point and ease of use, prevails in application of transportation, architecture and topographic surveys. Taking a laser rangefinder for example, a fundamental principle is as described below. A laser transmitter first emits a laser beam towards an object, a laser receiver receives a signal reflected from the object, and a time difference between the emitted laser beam and the received reflected signal is calculated and analyzed to obtain a distance between the laser rangefinder and the object. However, rather than measuring distances between the laser rangefinder and several detection points, a common laser rangefinder is capable of only measuring a distance between the laser rangefinder and one single object per measuring process, thus limiting an application scope of the laser measuring method.

SUMMARY OF THE INVENTION

Therefore the primary object of the present invention is to provide a solution for measuring distances between a laser rangefinder and multiple detection points.

To achieve the above object, a three-dimensional distance measuring system is provided. The three-dimensional distance measuring system comprises a light emitting device, a focusing element, a photosensitive memory element, and a computation unit electrically connected to the photosensitive memory element. The light emitting device transmits and projects at least one a beam set forming a projection plane onto a surface of an object. The beam set comprises a plurality of beams transmitted according to a predetermined first path function and arranged in a linear arrangement to form detection points on the surface of the object. The focusing element has a focus passed through by the beams of the beam set reflected by the surface of the object. The photosensitive memory element receives the beams of the beam set passing through the focus of the focusing element and forms a sense image. The computation unit obtains the sense image of the photosensitive memory element, and obtains a corresponding second path function according to an image formation position of each of the beams on the photosensitive memory element and a position of the focus of the focusing element to calculate an intersection position corresponding to each first path function and the corresponding second path function.

In one embodiment, the light emitting device comprises a light source that transmits the beam set according to a light transmission path, and a first diffraction optical element located on the light transmission path. The light emitting device further comprises a second diffraction optical element located between the light source and the first diffraction optical element.

In one embodiment, the beams of the beam set render a graphic code to be deciphered by the computation unit.

In one embodiment, the focus of the focusing element is located on the projection plane.

In one embodiment, the plurality of projection planes formed by the plurality of beam sets mutually intersect at an intersection axis, which passes through the focus of the focusing element. The light emitting device comprises a light source transmitting the beams set according to an optical transmission path, and a first diffraction optical element located on the optical transmission path. The intersection axis of the projection planes pass through the first diffraction optical element.

In one embodiment, the three-dimensional distance measuring system further comprises a filter lens disposed between the focusing element and the surface of the object. The filter lens allows only beams having a corresponding frequency to enter the focusing element.

In one embodiment, the three-dimensional distance measuring system further comprises a housing for accommodating the light emitting device, the focusing element, the photosensitive memory element and the computation unit.

A three-dimensional distance measuring method comprising the following steps is further provided.

In step (a), at least one beam set forming a projection plane is projected to an object surface. The beam set comprises a plurality of beams transmitted according to a predetermined first path function and arranged along a linear arrangement to form detection points on the surface of the object.

In step (b), the beams of the beam set reflected by the surface of the object pass through a focus of a focusing element to form a sense image on a photosensitive memory element.

In step (c), a corresponding second path function is obtained according to an image formation position of each of the beams on the photosensitive memory element and a position of the focus of the focusing element.

In step (d), an intersection position of each first path function and the corresponding second path function is calculated to obtain a spatial position of each of the detection points on the surface of the object.

In one embodiment, the three-dimensional distance measuring method further comprises: f) obtaining a natural light image reflected by the surface of the object through the photosensitive memory element.

In one embodiment, between step (b) and step (c), the three-dimensional distance measuring method further comprises: comparing the natural light image of the photosensitive memory element in step (f) and the sense image of the photosensitive memory element in step (b) to obtain an image comprising only the beam set.

In one embodiment, the three-dimensional distance measuring method further comprises: e) calculating distances between the different detection points according to different spatial positions of the detection points on the surface of the object.

In the three-dimensional distance measuring method and associated system, at least one beam set comprising a plurality of beams forming a projection plane and arranged in a linear arrangement is transmitted and projected onto a surface of an object. The linearly arranged beams are reflected and pass through a focus of a focusing element to form a sense image on a photosensitive optical element. In the sense image, the beams of the beam set remain in the linear arrangement in a same order. By utilizing the predetermined first path function, the corresponding second path function is obtained according to an image formation position of each of the beams on the photosensitive memory element and a position of the focus of the focusing element. As such, an intersection position corresponding to each first path function and the corresponding second path function is calculated to obtain a spatial position of each of the detection points on the object. Therefore, by forming the sense image on the photosensitive optical element through a single shot, the present invention is capable of obtaining the spatial position of each of the detection points on the object to further obtain a relative distance between any two detection points, thereby achieving three-dimensional distance measuring.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENTS

Figure 1:
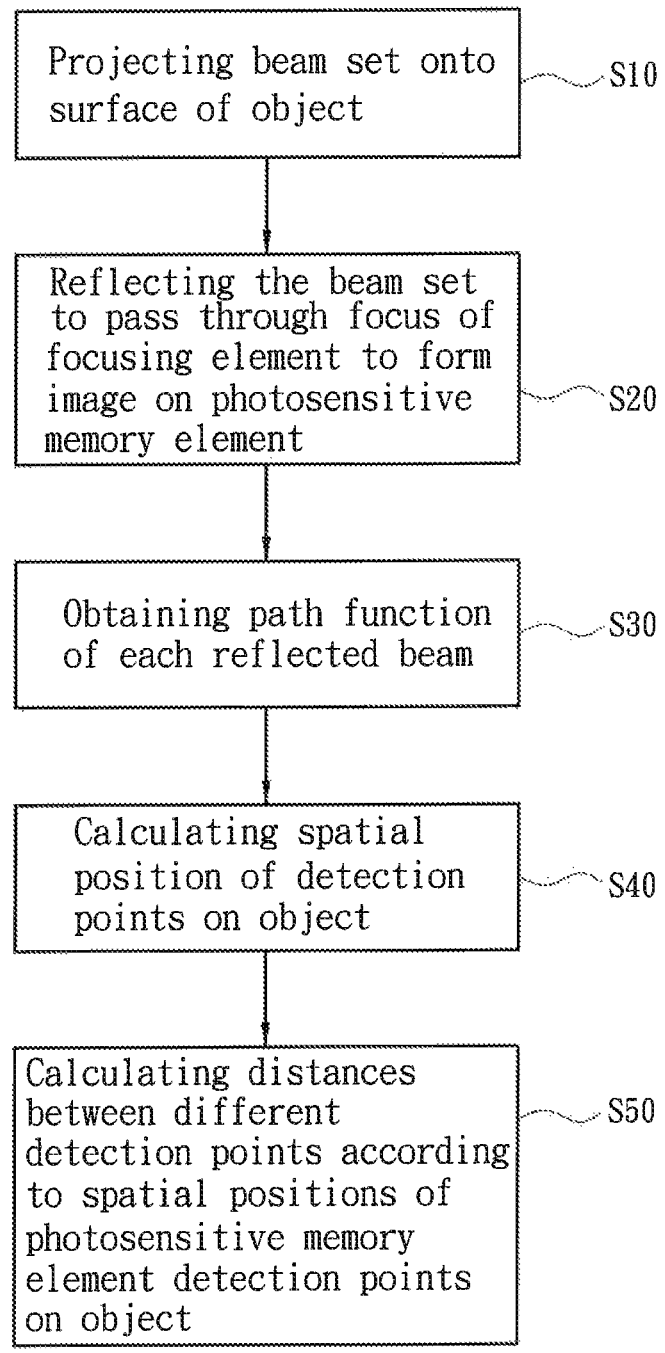
FIG. 1 is a flowchart of a three-dimensional distance measuring method according to an embodiment of the present invention.

FIG. 1 shows a flowchart of a three-dimensional distance measuring method according to one embodiment of the present invention. Referring to FIG. 1, the three-dimensional distance measuring method comprises the following steps. In step S10, a beam set is projected onto a surface of an object. More specifically, at least one beam set forming a projection plane is projected onto a surface of an object. The beam set comprises a plurality of beams transmitted according to a predetermined first path function and arranged along a linear arrangement to form detection points on the surface of the object. In step S20, the beam set is reflected and passes through a focus to form an image on a photosensitive memory element. More specifically, the beams of the beam set reflected by the surface of the object pass through a focus of a focusing element to form a sense image at a photosensitive memory element. In step S30, a path function of each of the beams reflected is obtained. According to an image formation position of each of the beams on the photosensitive memory element and a position of the focus of the focusing element, a corresponding second path function is obtained. In step S40, a spatial position of each of the detection points of the object is calculated. That is, an intersection position corresponding to each first path function and the corresponding second path function is calculated to obtain a spatial position of each of the detection points of the object. Step S50 may be selectively performed after step S40. In step S50, according to the spatial positions of different detection points of the object, distances between the different detection points are calculated.

Figure 2:
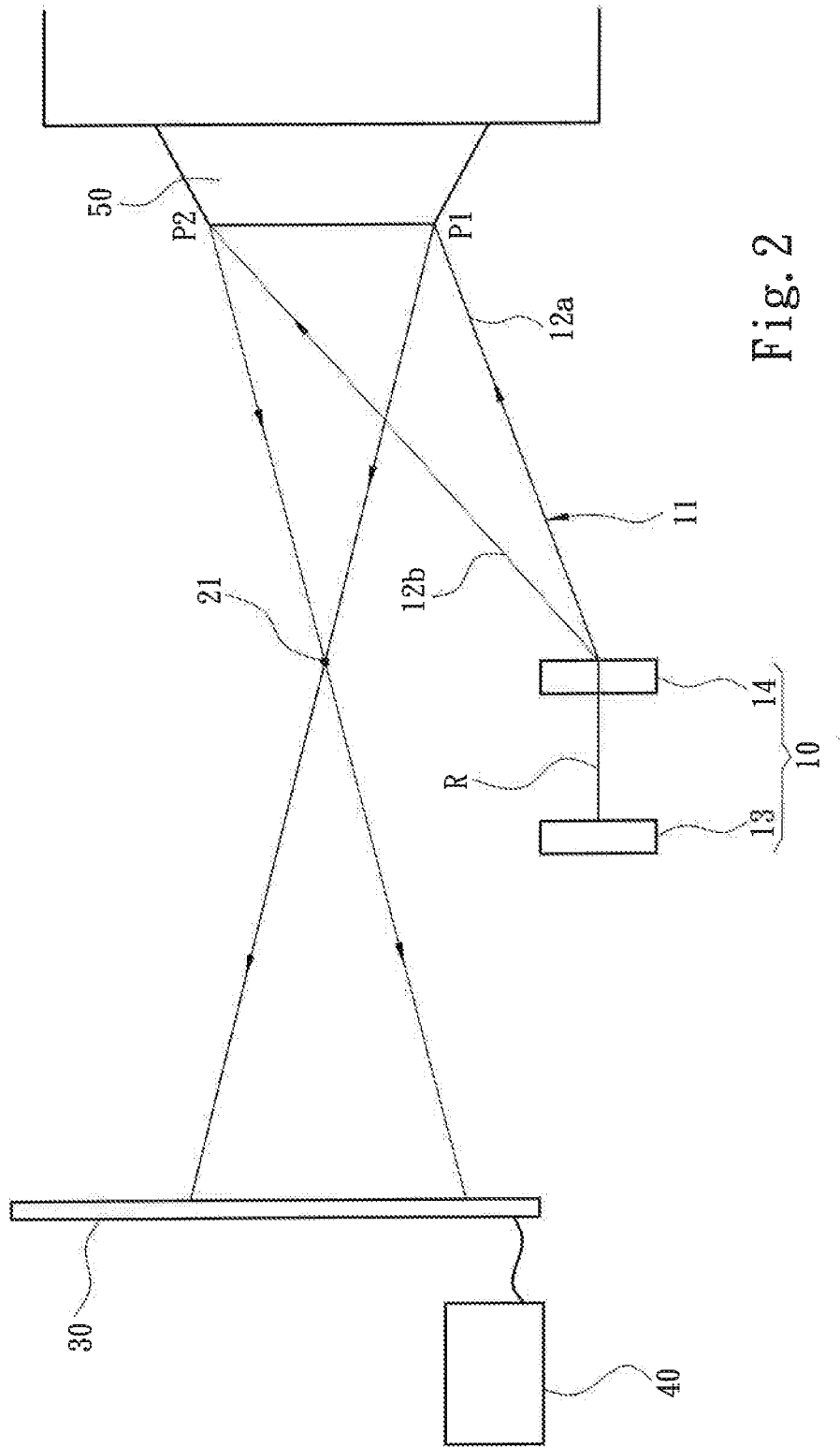
FIG. 2 is a schematic diagram of a two-dimensional optical path architecture of a three-dimensional distance measuring system according to an embodiment of the present invention.

FIG. 2 shows a schematic diagram of a two-dimensional optical path architecture of a three-dimensional distance measuring system according to one embodiment of the present invention. As shown in FIG. 2, the three-dimensional distance measuring system according to one embodiment of the present invention comprises a light emitting device 10, a focusing element, a photosensitive memory element 30, and a computation unit 40 electrically connected to the photosensitive memory element 30. The light emitting device 10 transmits at least one beam set 11 forming a projection plane onto a surface of an object 50. The beam set 11 comprises a plurality of beams 12a and 12b transmitted according to a predetermined first path function and arranged a linear arrangement to form detection points P1 and P2 on the surface of the object 50. In one embodiment, the light emitting device 10 comprises a light source 13 that transmits the beam set 11 according to an optical transmission path R, and a first diffraction optical element 14 located on the optical transmission path R. The beams transmitted by the light source 13 are laser. The focusing element has a focus 21 for the beams 12a and 12b of the beam set 11 reflected by the surface of the object 50 to pass through. The photosensitive memory element 30 receives the beams 12a and 12b of the beam set 11 passed through the focus 21 of the focusing element to form a sense image. The computation unit 40 obtains the sense image received by the photosensitive memory element 30. According to an image formation position of each of the beams 12a and 12b on the photosensitive memory element 30 and a position of the focus 21 of the focusing element, the computation unit 40 further obtains a corresponding second path function, and calculates an intersection position corresponding to the first path function and the corresponding second path function. The components of the three-dimensional distance measuring system may be independently disposed, or the light emitting device, the focusing element, the photosensitive memory element and the computation unit of the three-dimensional distance measuring system may be integrated through a housing into a handheld measuring device.

In the present invention, the photosensitive memory element 40 may also obtain a natural light image reflected by the surface of the object 50. When performing three-dimensional distance measuring, the photosensitive memory element 30 may obtain two successive sense images, one of which is a natural light image without the projected beam set, and the other is a sense image having the reflected beam set 11 passed through the focus 21. The computation unit 40 compares the natural light image and the sense image formed with the presence of the beam set 11 received from the photosensitive memory element 30 to obtain light spot information of the beams 12a and 12b of the beam set 11. In an alternative embodiment, the three-dimensional distance measuring system may further comprise a filter lens disposed between the focusing element and the surface of the object 50. The filter lens allows beams having the frequencies as those of the beams 12a and 12b to enter the focusing element. Thus, only beams with the same frequencies as the beams 12a and 12b may form an image on the photosensitive memory element 30, so as to enable the computation unit 40 to readily obtain the light spot information of the beams 12a and 12b of the beam set 11. After obtaining the light spot information of the beams 12a and 12b, the natural light image may be utilized to determine physical images corresponding to the detection points for each of the light spots, so as to facilitate the user to select basis for determining distances between different detection points or the distance of a single detection point.

Figure 3:
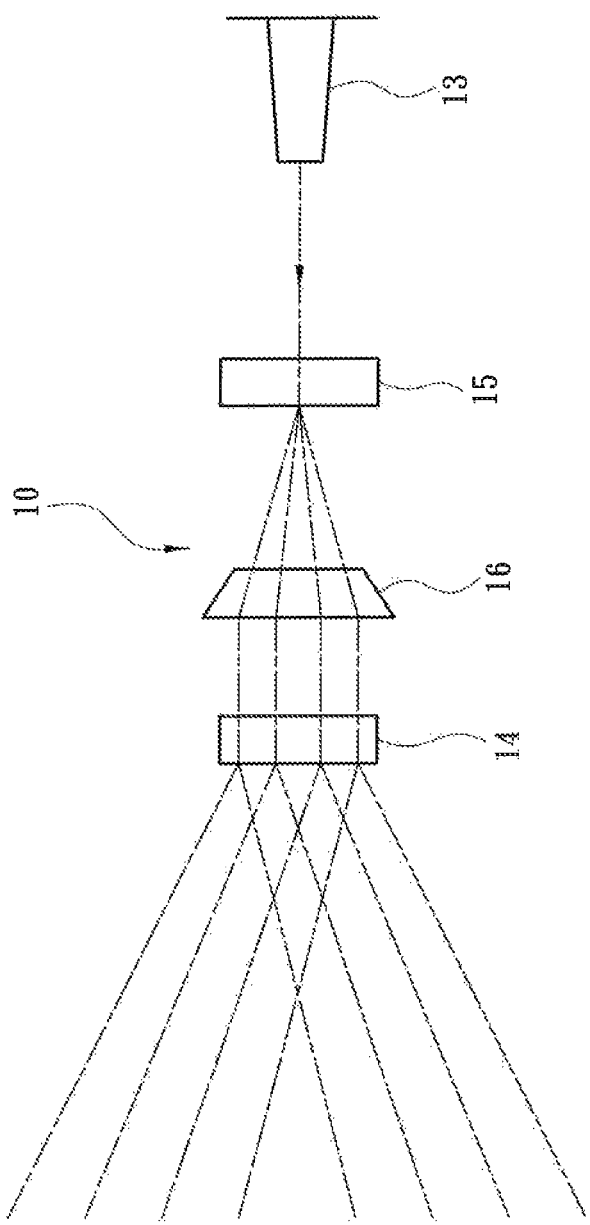
FIG. 3 is a schematic diagram of a light emitting device of a three-dimensional distance measuring system with an enhanced measurement resolution according to an embodiment of the present invention.

To further enhance a resolution, the light emitting device 10 comprises a second diffraction optical element 15 and a reflection mirror 16 located between the first diffraction element 14 and the optical transmission path, as shown in FIG. 3. For example, the first diffraction optical element 14 is capable of generating four times of the beams 12a and 12b through diffraction, and the second diffraction optical element 15 is capable of generating twice of the beams 12a and 12b. As such, four laser beams are generated when the laser beam transmitted by the light source 13 reaches the second diffraction optical element 15. The four laser beams generated by the second refraction optical element 15 are reflected into parallel beams, which then enter the first refraction optical element 14 to project into eight laser beams to the surface of the object 50, thereby effectively enhancing the measurement resolution.

Figure 4:
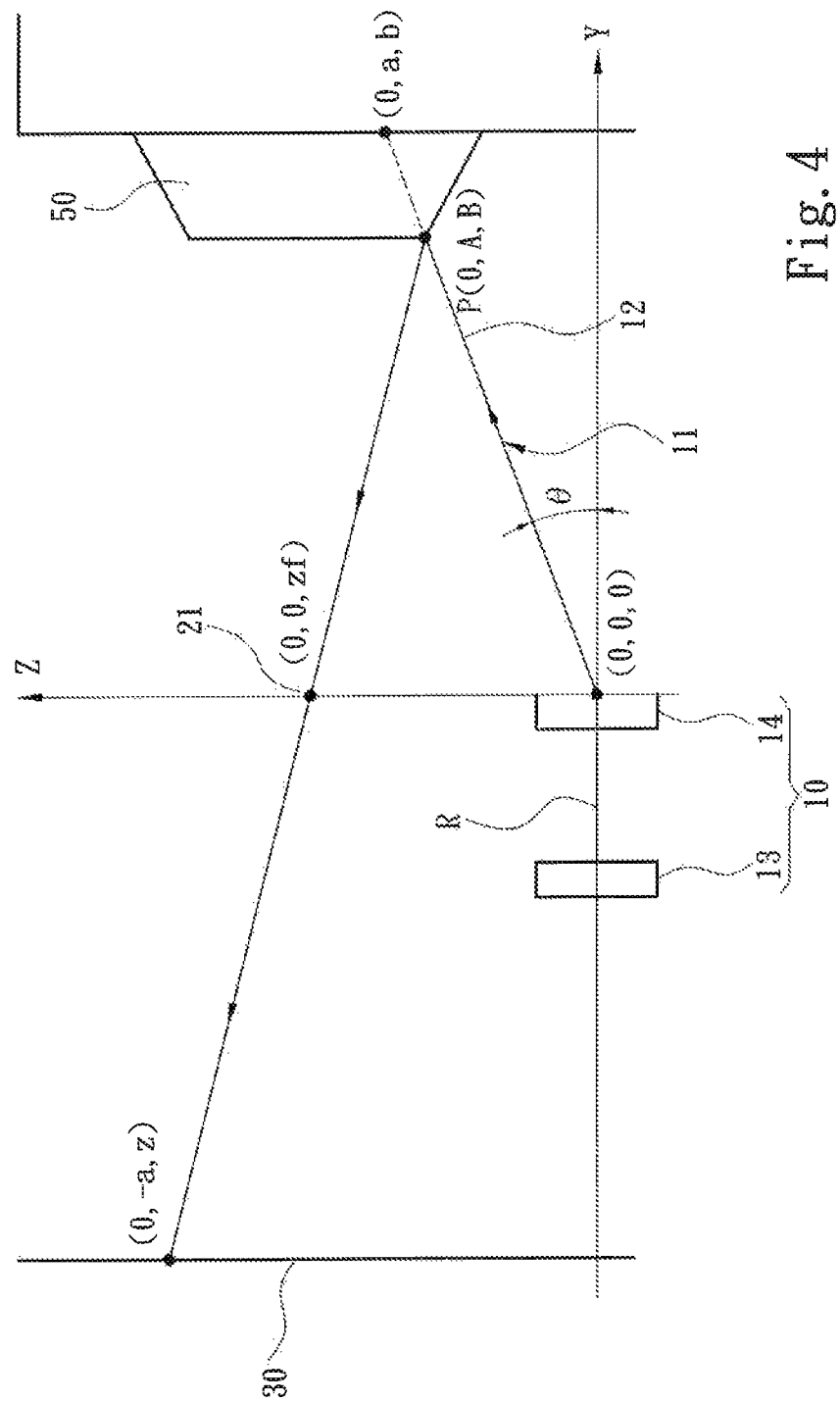
FIG. 4 is a schematic diagram of a single beam optical path architecture expressed in coordinates according to an embodiment of the present invention.

To better explain measuring principles of the present invention, descriptions are given below with reference to FIG. 4 showing a schematic diagram of a single beam optical path architecture expressed in coordinates according to one embodiment of the present invention. It is known that a beam 12 of the beam set 11 has origin coordinates (0, 0, 0), and is projected onto a detection P on the surface of the object 50 according to a first path function (1) on an YZ plane. The first path function (1) is:

$$Z = \tan\theta \times Y = (b/a) \times Y \quad (1)$$

As the beam 12 reflected by the surface of the object 50 under test passes through the focus 21 of the focusing element located at coordinates (0, 0, zf) to form an image on the photosensitive memory element 30, coordinates of the image formation position are (0, −a, z). According to the coordinates (0, 0, zf) of the focus 21 and the coordinates (0, −a, z) of the image formation position, a second path function (2) is obtained. The second path function (2) is;

$$Z = [(zf-z)/a] \times Y + zf \quad (2)$$

By simultaneously solving the first path function (1) and the second path function (2), coordinates (0, A, B) of the detection point P are obtained.

By substituting Z of the first path function (1) into the second path function (2), A(3.1) is obtained:

$$A = a \times zf/(z+b-zf) \quad (3.1)$$

By substituting Y of the first path function (1) into the second path function (2). B(3.2) is obtained:

$$B = b \times zf/(z+b-zf) \quad (3.2)$$

Therefore, the coordinates of the detection point P are (0, a×zf/(z+b−zf)), b×zf/(z+b−d)). Spatial coordinates of all the other detection points of each of the beams 12 projected onto the surface of the object 50 can be accordingly obtained.

Figure 5:
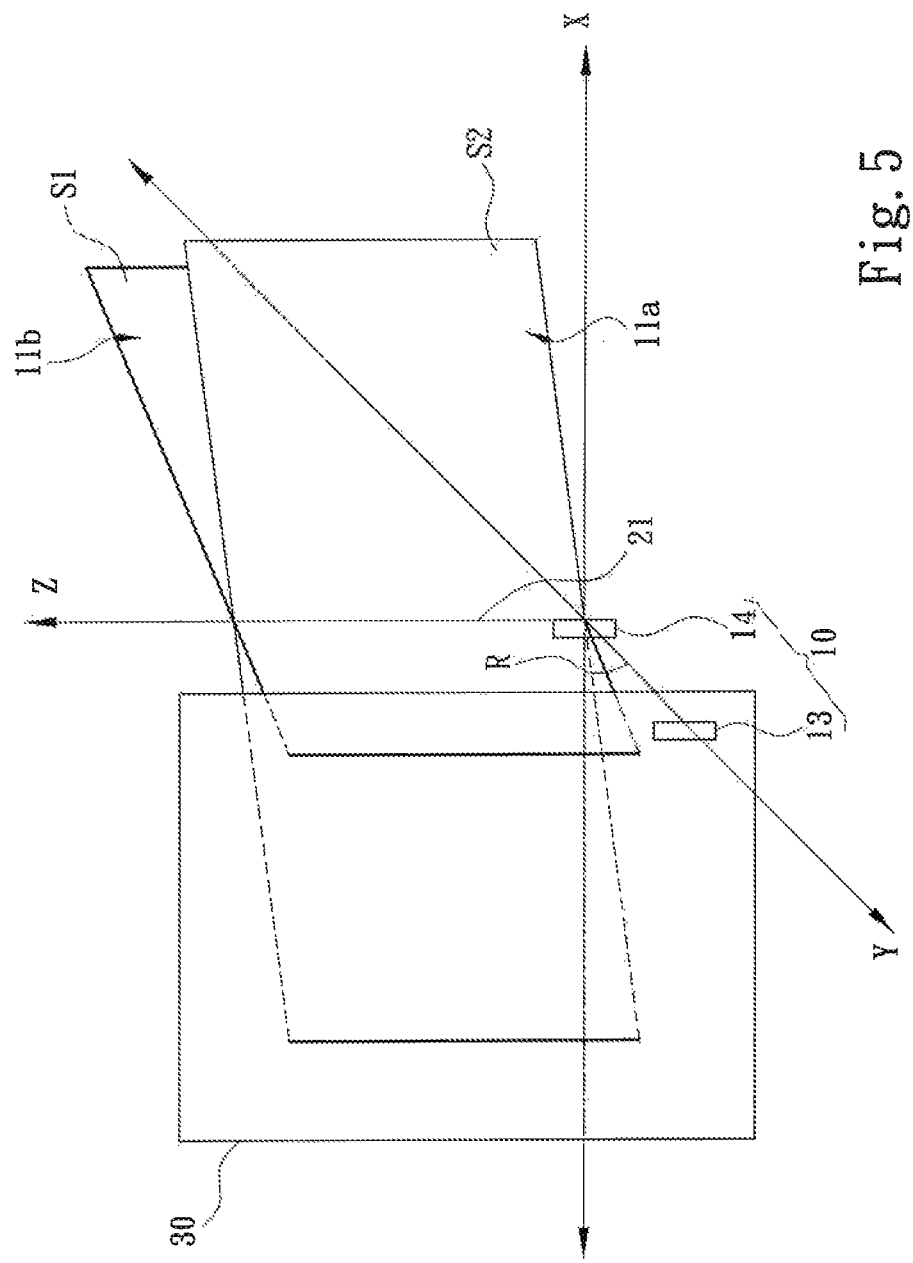
FIG. 5 is a schematic diagram of a three-dimensional optical path architecture of a three-dimensional distance measuring system according to an embodiment of the present invention.

The present invention may implement multiple beam sets 11a and 11b (two beam sets are described as an example in the embodiment). Each of the beam sets 11a and 11b comprises a plurality of beams 12 projected along a linear arrangement to form corresponding projection planes S1 and S2, as shown in FIG. 5. The projection planes S1 and S2 mutually intersect at an intersection axis. In FIG. 5, the intersection axis is defined to superpose on the Z axis. The focus 21 of the focusing element is located on the projection planes S1 and S2, and the intersection axis passes through the focus 21 of the focusing element as well as the first diffraction optical element 14 of the light emitting device 10. All of the beams 12 of each of the beam sets 11a and 11b pass through the focus 21 on the intersection axis after being reflected by the surface of the object 50, and forms a sense image on the photosensitive memory element 30. The image formed by the beams 12 of each of the beam sets 11a and 11b on the photosensitive optical element 30 is in a linear arrangement in a reversed order. That is to say, the beams 12 of the beam sets 11a and 11b are arranged into a straight line on the photosensitive optical element 30. Again referring to FIG. 2, the computation unit 40 electrically connected with the photosensitive memory element 30 may identify each of the beams of the beam sets 11a and 11b according to an ordering regularity to obtain the first path function of each of the beams. To accelerate the speed and to reinforce the accuracy of the computation unit 40 in identifying the beams, the beams projected by the beam sets 11a and 11b render a graphic code to be deciphered by the computation unit 40. The graphic code may be presented in different shapes and areas or in different light spots, e.g., a quadrilateral, a circle or a high-brightness rhombus. Alternatively, different lasers may be changed to different frequencies when passing through the first diffraction optical element 14, or a filter lens may also be additionally disposed on a reflection path of the beams to achieve accelerated identification of the beams.

Figure 6:
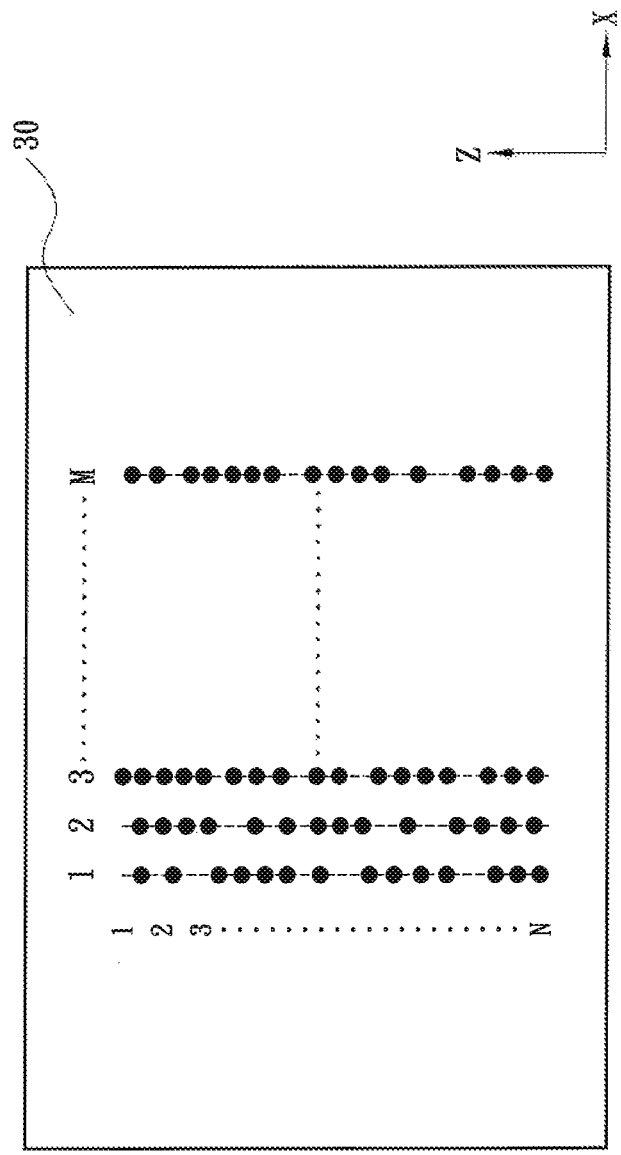
FIG. 6 is a schematic diagram of image formation of a sense image on a photosensitive optical element of a three-dimensional distance measuring system according to an embodiment of the present invention.

Referring to FIG. 6, in an alternative embodiment, assuming that an M number of beam sets each comprising an N number of beams are provided, the sense image on the photosensitive memory element 30 displays an M×N matrix, where M and N are an integer greater than 1. As shown in FIG. 6, the light spots presenting the N number of beams on the photosensitive optical element 30 are in a linear arrangement. The computation unit 40 obtains the M×N matrix of the sense image, and analyzes the position coordinates of each of the beams reflected and projected on the photosensitive optical element 30, so as to obtain the spatial position of each of the detection points of the beams projected onto the surface of the object 50 through the foregoing measuring principles.

Therefore, the three-dimensional distance measuring method and associated system, by forming a sense image on the photosensitive optical element through a single shot, is capable of obtaining a spatial position of each of the detection points on the object. Hence, a relative distance between any two detection points can be obtained to achieve three-dimensional distance measuring effects for enhancing the ease of use and efficiency for a measurer.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A three-dimensional distance measuring system, comprising:
   a light emitting device, for transmitting at least one beam set forming a projection plane directly onto a surface of an object, the beam set comprising a plurality of beams which are arranged in a linear arrangement and located on the projection plane and respectively transmitted according to a predetermined first path function to form detection points on the surface of the object;
   a focusing element, having a focus passed through by the beams of the beam set reflected by the surface of the object, wherein the focusing element, the beam set and the light emitting device are located on the same projection plane;
   a photosensitive memory element, for receiving the beams of the beam set passing through the focus of the focusing element to form a sense image; and
   a computation unit, electrically connected to the photosensitive memory element, for obtaining the sense image, obtaining a corresponding second path function according to an image formation position of each of the beams on the photosensitive memory element and a position of the focus of the focusing element, and calculating a sole intersection position of the first path function and the corresponding second path function of each of the beams.

2. The three-dimensional distance measuring system of claim 1, wherein the light emitting device comprises a light source transmitting the beam set according to a light emitting path, and a first diffraction optical element located on the light emitting path.

3. The three-dimensional distance measuring system of claim 2, wherein the light emitting device further comprises a second diffraction optical element located on the optical transmission path between the optical transmission source and the first diffraction optical element.

4. The three-dimensional distance measuring system of claim 1, wherein each of the beams projected by the beam set renders a graphic code to be deciphered by the computation unit.

5. The three-dimensional distance measuring system of claim 1, wherein the focus of the focusing element is located on the projection plane.

6. The three-dimensional distance measuring system of claim 1, wherein a plurality of projection planes formed by the plurality of beam sets mutually intersect at an intersection axis passing through the focus of the focusing element.

7. The three-dimensional distance measuring system of claim 6, wherein the light source transmitting the beam set according to a light emitting path, and a first diffraction optical element located on the light emitting path; and the intersection axis at which the projection planes mutually intersect passes through the first diffraction optical element.

8. The three-dimensional distance measuring system of claim 1, further comprising:
   a filter lens, disposed between the focusing element and the surface of the object, for allowing beams having a corresponding frequency to enter the focusing element.

9. The three-dimensional distance measuring system of claim 1, further comprising:
   a housing for accommodating the light emitting device, the focusing element, the photosensitive memory element and the computation unit.

10. A three-dimensional distance measuring method, comprising:
    a) providing and projecting at least one beam set forming a projection plane directly onto a surface of an object; the beam set comprising a plurality of beams which are arranged in a linear arrangement and located on the projection plane and respectively transmitted according to a predetermined first path function to form detection points the on the surface of the object;
    b) rendering the beams of the beam set reflected by the surface of the object to pass through a focus of a focusing element to form a sense image on a photosensitive memory element, wherein the focusing element, the beam set and the light emitting device are located on the same projection plane;
    c) obtaining a corresponding second path function according to an image formation position of each of the beams on the photosensitive memory element and a position of the focus of the focusing element; and
    d) calculating a sole intersection position of the first path function and the corresponding second path function of each of the beams to obtain a spatial position of each of the detection points on the object.

11. The three-dimensional distance measuring method of claim 10, wherein the focus of the focusing element is located on the projection plane.

12. The three-dimensional distance measuring method of claim 10, wherein a plurality of projection planes formed by the plurality of beam sets mutually intersect at an intersection axis passing through the focus of the focusing element.

13. The three-dimensional distance measuring method of claim 10, further comprising:
    e) calculating distances between the different detection points according to spatial positions of the detection points on the object.

14. The three-dimensional distance measuring method of claim 10, wherein step (b) further comprises:
    allowing only beams having a corresponding frequency to enter the focusing element.

15. The three-dimensional distance measuring method of claim 10, further comprising:
    f) obtaining a natural light image reflected by the surface of the object through the photosensitive memory element.

16. The three-dimensional distance measuring method of claim 14, between steps (b) and (c), further comprising:
    comparing the natural light image of the photosensitive memory element in step (f) and the sense image of the photosensitive memory element in step (b) to obtain an image having only the beam set.

* * * * *